(12) United States Patent
Nanri et al.

(10) Patent No.: US 8,280,421 B2
(45) Date of Patent: Oct. 2, 2012

(54) TERMINAL DEVICE AND BASE STATION DEVICE

(75) Inventors: Masahiko Nanri, Yokohama (JP);
Tsutomu Onuki, Yokohama (JP);
Takayuki Kawamura, Yokohama (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 12/672,978

(22) PCT Filed: Aug. 8, 2008

(86) PCT No.: PCT/JP2008/002187
§ 371 (c)(1),
(2), (4) Date: Feb. 10, 2010

(87) PCT Pub. No.: WO2009/022462
PCT Pub. Date: Feb. 19, 2009

(65) Prior Publication Data
US 2012/0004002 A1    Jan. 5, 2012

(30) Foreign Application Priority Data
Aug. 10, 2007    (JP) .................................. 2007-209915

(51) Int. Cl.
*H04W 74/08* (2009.01)
(52) U.S. Cl. ..................... 455/509; 455/515; 455/67.16; 455/458
(58) Field of Classification Search ............... 455/456.5, 455/456.6, 509, 511, 424, 425, 450, 452.1, 455/451, 404.2, 440, 452.2, 456.1, 456.2, 455/464, 515, 67.1, 423, 403, 561, 562, 522, 455/436, 452, 69, 405, 67.16; 370/345, 335, 370/342, 329, 336, 347, 333, 280, 350
See application file for complete search history.

(56) References Cited

U.S. PATENT DOCUMENTS 6,493,540 B1 * 12/2002 Suzuki ........................ 455/67.11
6,633,559 B1 * 10/2003 Asokan et al. ................. 370/350
(Continued)

OTHER PUBLICATIONS

"3rd Generation Partnership Project; Technical Specification Group Radio Access Network; Physical channels and mapping of transport channels onto physical channels (FDD)" Technical Specification 3G TS 25.211 V3.2.0 (Mar. 2000), 3GPP Organizational Partners, Valbonne, France (1999).

(Continued)

*Primary Examiner* — Tan Trinh
(74) *Attorney, Agent, or Firm* — Seed IP Law Group PLLC

(57) ABSTRACT

A terminal device free of interference between an RACH and a PUSCH or the like even when a base station device with a large coverage is installed. In the device, a configuration number extraction unit (103) extracts a configuration number from a BCH received by a BCH reception unit (102). A control unit (104) determines the corresponding RACH format (the necessity of repetition, the CP length TCP, the second preamble length TPRE2, and the GT length TGT) according to the configuration number, notifies a repetition unit (109) of the result of the judgment of necessity of repetition, notifies the repetition unit (109) of the second preamble length TPRE2, notifies a CP addition unit (110) of the CP length TCP, and notifies a GT addition unit (112) of the GT length TGT. When the repetition unit (109) receives the notification of performing the repetition, it performs the repetition according to the second preamble length received from a TPRE2 determination section (154). The CP addition unit (110) produces a CP according to the CP length received from a TCP determination section (155).

6 Claims, 15 Drawing Sheets

U.S. PATENT DOCUMENTS

| | | | | |
|---|---|---|---|---|
| 6,956,829 | B2* | 10/2005 | Lee et al. | 370/280 |
| 8,081,617 | B2* | 12/2011 | Iwai et al. | 370/342 |
| 2002/0131379 | A1* | 9/2002 | Lee et al. | 370/333 |
| 2003/0069044 | A1* | 4/2003 | Yotsumoto | 455/561 |
| 2003/0108027 | A1* | 6/2003 | Kim et al. | 370/345 |
| 2003/0130011 | A1* | 7/2003 | Hiramatsu et al. | 455/561 |
| 2005/0025095 | A1* | 2/2005 | Kim | 370/329 |
| 2005/0117547 | A1* | 6/2005 | Lu | 370/335 |
| 2007/0015529 | A1* | 1/2007 | Choi et al. | 455/522 |
| 2007/0238463 | A1* | 10/2007 | Ogami | 455/436 |

OTHER PUBLICATIONS

International Search Report, mailed Sep. 22, 2008, issued in corresponding International Application No. PCT/JP2008/002187, filed Aug. 8, 2008.

LG Electronics, "Additional Burst Types for Non-Synchronized RACH," 3GPP TSG RAN WG1 Meeting #49bis, R1-072862, Orlando, Fla., Jun. 25-29, 2007, pp. 1-2.

LG Electronics, "Cyclic Shift Configuration Set for Non-Synchronized RACH," 3GPP TSG RAN WG1 Meeting #49bis, R1-072863, Orlando, Fla., Jun. 25-29, 2007, pp. 1-2.

LG Electronics, "Preamble Allocation for Non-Synchronized RACH," 3GPP TSG RAN WG1 Meeting #49, R1-072330, Kobe, Japan, May 7-11, 2007, pp. 1-3.

Panasonic, NTT DoCoMo, "Random Access Burst Design for E-UTRA," TSG RAN WG1 Meeting #46, R1-062175, Tallinn, Estonia, Aug. 28-Sep. 1, 2006, pp. 1-9.

Office Action relating to Japanese Patent Application No. 2009-528028, mailed Apr. 27, 2010, 3 pages.

"Non-synchronized RACH Range Extension," 3GPP TSG RAN WG1 #48bis, Mar. 26-30, 2007, 6 pages, St. Julians, Malta.

Office Action dated Feb. 24, 2012, from the State IP Office of the P.R.C. For corresponding Chinese Patent Application No. 20080025454.7, 5 pages.

LGE, "RACH Sequence Extension Methods for Large Cell Deployment," 3GPP TSG RAN1 LTE WG1 Meeting #46, R1-062306, Tallinn, Estonia, Aug. 28-Sep. 1, 2006, 9 pages.

* cited by examiner

| CONFIGURATION NUMBER | NUMBER OF PREAMBLE SEQUENCES PER CELL | NUMBER OF CYCLIC SHIFTS PER PREAMBLE | CYCLIC SHIFT LENGTH [SAMPLES] | MAXIMUM CELL RADIUS [km] |
|---|---|---|---|---|
| 0 | 1 | 64 | 13 | 1.1 |
| 1 | 2 | 32 | 26 | 2.9 |
| 2 | 3 | 22 | 38 | 4.5 |
| 3 | 4 | 16 | 52 | 6.5 |
| 4 | 5 | 13 | 64 | 8.1 |
| 5 | 6 | 11 | 76 | 9.8 |
| 6 | 7 | 10 | 83 | 10.8 |
| 7 | 8 | 8 | 104 | 13.7 |
| 8 | 10 | 7 | 119 | 15.8 |
| 9 | 11 | 6 | 139 | 18.6 |
| 10 | 13 | 5 | 167 | 22.4 |
| 11 | 16 | 4 | 209 | 28.3 |
| 12 | 22 | 3 | 279 | 38.0 |
| 13 | 32 | 2 | 419 | 57.4 |
| 14 | 64 | 1 | 839 | 115.8 |
| 15 | RESERVED | RESERVED | RESERVED | RESERVED |

FIG.6

| CONFIGURATION NUMBER Nc | NUMBER OF PREAMBLE SEQUENCES PER CELL | NUMBER OF CYCLIC SHIFTS PER PREAMBLE | CYCLIC SHIFT LENGTH [SAMPLES] | MAXIMUM CELL RADIUS [km] | FRAME FORMAT NUMBER | REPETITION | CP LENGTH $T_{CP}$ [msec] | SECOND PREAMBLE LENGTH $T_{PRE2}$ [msec] | GT LENGTH $T_{GT}$ [msec] |
|---|---|---|---|---|---|---|---|---|---|
| 0 | 1 | 64 | 13 | 1.1 | 1 | DISABLE | 0.1 | 0 | 0.1 |
| 1 | 2 | 32 | 26 | 2.9 | 1 | DISABLE | 0.1 | 0 | 0.1 |
| 2 | 3 | 22 | 38 | 4.5 | 1 | DISABLE | 0.1 | 0 | 0.1 |
| 3 | 4 | 16 | 52 | 6.5 | 1 | DISABLE | 0.1 | 0 | 0.1 |
| 4 | 5 | 13 | 64 | 8.1 | 1 | DISABLE | 0.1 | 0 | 0.1 |
| 5 | 6 | 11 | 76 | 9.8 | 1 | DISABLE | 0.1 | 0 | 0.1 |
| 6 | 7 | 10 | 83 | 10.8 | 1 | DISABLE | 0.1 | 0 | 0.1 |
| 7 | 8 | 8 | 104 | 13.7 | 1 | DISABLE | 0.1 | 0 | 0.1 |
| 8 | 10 | 7 | 119 | 15.8 | 2 | ENABLE | 0.2 | 0.8 | 0.2 |
| 9 | 11 | 6 | 139 | 18.6 | 2 | ENABLE | 0.2 | 0.8 | 0.2 |
| 10 | 13 | 5 | 167 | 22.4 | 2 | ENABLE | 0.2 | 0.8 | 0.2 |
| 11 | 16 | 4 | 209 | 28.3 | 2 | ENABLE | 0.2 | 0.8 | 0.2 |
| 12 | 22 | 3 | 279 | 38.0 | 2 | ENABLE | 0.2 | 0.7 | 0.3 |
| 13 | 32 | 2 | 419 | 57.4 | 2 | ENABLE | 0.2 | 0.6 | 0.4 |
| 14 | 64 | 1 | 839 | 115.8 | 2 | ENABLE | 0.2 | 0.2 | 0.8 |
| 15 | RESERVED | RESERVED | RESERVED | RESERVED | RESERVED | RESERVED | RESERVED | RESERVED | RESERVED |

FIG.8

| CONFIGURATION NUMBER Nc | NUMBER OF PREAMBLE SEQUENCES PER CELL | NUMBER OF CYCLIC SHIFTS PER PREAMBLE | CYCLIC SHIFT LENGTH [SAMPLES] | MAXIMUM CELL RADIUS [km] | FRAME FORMAT NUMBER | REPETITION | CP LENGTH $T_{CP}$ [msec] | SECOND PREAMBLE LENGTH $T_{PRE2}$ [msec] | GT LENGTH $T_{GT}$ [msec] |
|---|---|---|---|---|---|---|---|---|---|
| 0 | 1 | 64 | 13 | 1.1 | 1 | DISABLE | 0.1 | 0 | 0.1 |
| 1 | 2 | 32 | 26 | 2.9 | 1 | DISABLE | 0.1 | 0 | 0.1 |
| 2 | 3 | 22 | 38 | 4.5 | 1 | DISABLE | 0.1 | 0 | 0.1 |
| 3 | 4 | 16 | 52 | 6.5 | 1 | DISABLE | 0.1 | 0 | 0.1 |
| 4 | 5 | 13 | 64 | 8.1 | 1 | DISABLE | 0.1 | 0 | 0.1 |
| 5 | 6 | 11 | 76 | 9.8 | 1 | DISABLE | 0.1 | 0 | 0.1 |
| 6 | 7 | 10 | 83 | 10.8 | 1 | DISABLE | 0.1 | 0 | 0.1 |
| 7 | 8 | 8 | 104 | 13.7 | 1 | DISABLE | 0.1 | 0 | 0.1 |
| 8 | 10 | 7 | 119 | 15.8 | 2 | ENABLE | 0.2 | 0.8 | 0.2 |
| 9 | 11 | 6 | 139 | 18.6 | 2 | ENABLE | 0.2 | 0.8 | 0.2 |
| 10 | 13 | 5 | 167 | 22.4 | 2 | ENABLE | 0.2 | 0.8 | 0.2 |
| 11 | 16 | 4 | 209 | 28.3 | 2 | ENABLE | 0.2 | 0.8 | 0.2 |
| 12 | 22 | 3 | 279 | 38.0 | 2 | ENABLE | 0.1 | 0.8 | 0.3 |
| 13 | 32 | 2 | 419 | 57.4 | 2 | ENABLE | 0 | 0.8 | 0.4 |
| 14 | 64 | 1 | 839 | 115.8 | 2 | ENABLE | 0 | 0.4 | 0.8 |
| 15 | RESERVED | RESERVED | RESERVED | RESERVED | RESERVED | RESERVED | RESERVED | RESERVED | RESERVED |

FIG.11

TERMINAL DEVICE AND BASE STATION DEVICE

TECHNICAL FIELD

The present invention relates to a terminal apparatus and a base station apparatus that carry out radio communication.

BACKGROUND ART

FIG. 1 is a diagram illustrating a slot for RACH (Random Access Channel) (Access Slot) and a slot for SCH (Shared Channel) (Time Slot) defined in a W-CDMA (Wideband Code Division Multiple Access) system. For both slots, one frame is 10 [msec]. The access slot uses a portion resulting from dividing two frames into 14 portions as a transmission unit for RACH. On the other hand, the time slot uses a portion resulting from dividing one frame into 14 portions as a transmission unit for SCH. Therefore, the transmission unit for RACH is twice as long as SCH.

The access slot and time slot operate in parallel temporally. That is, RACH and SCH may be received simultaneously by a base station apparatus. However, since the 3G (third-generation) adopts the CDMA scheme, and RACH and SCH are spectrum-spread with spread codes which are orthogonal to each other, the base station apparatus can demodulate RACH and SCH.

On the other hand, the 3GPP Long Term Evolution (hereinafter referred to as "LTE") is currently studying about a base station apparatus having a wide range communicable area (coverage). When the base station apparatus secures a wide range coverage, a timing of receiving a signal transmitted from each terminal apparatus significantly differs from each other, depending on the positional relationship between the base station apparatus and each terminal apparatus. For example, the propagation delay of a terminal apparatus located in the vicinity of a base station apparatus decreases because the distance between the base station apparatus and the terminal apparatus is small. On the other hand, the propagation delay of a terminal apparatus located at an end point (cell edge) of the communicable area increases because the distance between the base station apparatus and the terminal apparatus is large.

According to the LTE, a base station can control transmission timing of a terminal apparatus arbitrarily by using a time alignment function. And therefore, regarding a channel transmitted from a terminal apparatus after a connection between the base station apparatus and the terminal apparatus is established, i.e. PUSCH (Physical Uplink Shared Channel) and PUCCH (Physical Uplink Control Channel), differences in propagation delays among terminal apparatuses are not considerable.

Non-Patent Document 1: TS25.211 pp. 13-15

DISCLOSURE OF INVENTION

Problems to be Solved by the Invention

However, since the time alignment function does not work at the time of establishment of an initial connection, differences in propagation delays among terminal apparatuses pose a big problem when the base station apparatus secures a wide range coverage. Hereinafter, this problem will be explained using the accompanying drawings.

FIG. 2 is a system configuration diagram showing a case where two terminal apparatuses are located within a coverage of one base station apparatus. In FIG. 2, suppose terminal apparatus A is located in the vicinity of the base station apparatus and terminal apparatus B is located at a cell edge. First, terminal apparatuses A and B perform a cell search using P-SCH (Primary Synchronization Channel) regularly transmitted from the base station apparatus. Each terminal apparatus A or B then sets a transmission timing of RACH based on a reception timing of P-SCH acquired in the cell search processing, transmits RACH to the base station apparatus at this transmission timing and makes a connection request. At the stage where the base station apparatus receives RACH, a connection between the base station apparatus and the terminal apparatus is established.

FIG. 3 illustrates a lapse of time after the base station apparatus transmits P-SCH until receiving RACH. Suppose the base station apparatus transmits P-SCH at time $T_{Tx}$. Terminal apparatuses A and B perform a cell search using this P-SCH and detect a reception timing of P-SCH. However, since apparatuses A and B have different distances from the base station apparatus, terminal apparatus A and terminal apparatus B have different reception timings of P-SCH. Terminal apparatuses A and B transmit RACH based on the reception timings of P-SCH. The base station apparatus detects respective reception timings $T_{Rx A}$ and $T_{Rx B}$ of RACH, measures respective propagation delays $T_{DL\_A}$ and $T_{DL\_B}$ of terminal apparatuses A and B and instructs terminal apparatuses A and B to adjust an uplink transmission timing as time alignment.

Thus, since an initial time alignment is performed in an RACH sequence, a propagation delay between uplink and downlink needs to be secured. Here, assuming that the coverage of the base station apparatus is a circle and the radius (cell radius) is D[m] and the velocity of light is c[m/s] for simplicity, the propagation delay $T_{PD}$ between uplink and downlink becomes as shown in equation 1 below. For example, when the cell radius is 15 [km], the propagation delay $T_{PD}$ between uplink and downlink becomes 0.1 [msec].

$$T_{PD} = \frac{2D}{c} [\text{sec}] \quad \text{(Equation 1)}$$

FIG. 4 is a diagram illustrating a first frame format (Format No.=1) of an uplink of the LTE, the upper part of FIG. 4 illustrates a frame configuration and the lower part of FIG. 4 illustrates a RACH configuration. One frame is 10 [msec] long and is made up of ten transmission unit TTIs (Transmission Time Interval). Of the ten TTIs, the first TTI is assigned to RACH and the remaining TTIs are assigned to PUSCH or PUCCH.

Since the time alignment function is not working during a RACH sequence, 0.1 [msec] is secured for CP (Cyclic Prefix) and GT (Guard Time) respectively. Here, "CP" refers to a redundant portion, which is a copy made of the last part of a symbol and added to the head of the symbol, to prevent the influence of a delay wave. On the other hand, "preamble" is an initial connection request signal portion generated according to a certain generation rule and the base station detects this preamble to thereby detect a connection request from the terminal apparatus. Furthermore, "GT" is an interval during which no data is transmitted (non-transmission section). Note that, CP and GT of PUSCH and PUCCH are respectively defined as 4.69 [μsec] and 0 [μsec] in the LTE, because the time alignment function is working on them.

With the effect of the addition of CP, it is possible to secure the gain of correlation detection of RACH preamble even if there is any uplink/downlink propagation delay. Furthermore, with the effect of the addition of GT, interference with neighboring TTIs can be avoided. According to a frame format of FIG. 4 a coverage having 0.1 [msec] propagation delay between the uplink and downlink, that is, a coverage having a cell radius of up to 15 [km] can be secured.

To secure an area of a wider range, the 3GPP is also currently proposing a second frame format (Format No.=2) shown in FIG. 5 as an option in addition to FIG. 4. According to this frame format, as shown in the upper part of FIG. 5, first two TTIs of the frame are assigned to RACH, and as shown in the lower part of FIG. 5, 0.2 [msec] is secured for CP and GT respectively and preambles each having 0.8 [msec] long are repeatedly arranged (Repetition) as the preamble section.

A calculation result according to equation 1 above shows that a coverage having a cell radius of 30 [km] is secured according to the frame format in FIG. 5.

However, installations of base station apparatuses with greater coverage are sought after in foreign countries, because, differently from Japan, those countries have many topographic features which afford quite unobstructed views.

There is an agreement in the LTE that a base station apparatus broadcasts a 4-bit configuration number (information about the cell radius) according to the cell radius to a terminal apparatus and the terminal apparatus thereby transmits RACH corresponding to the configuration number. FIG. 6 is a diagram illustrating examples of configuration numbers proposed in R1-072330. In this example, a cell radius of a maximum 115.8 [km] is proposed.

When a coverage having a cell radius of 115.8 [km] is secured according to the frame format shown in FIG. 5, the RACH transmitted by a terminal apparatus located in the vicinity of the cell edge may temporally overlap with PUSCH or PUCCH transmitted by another terminal apparatus located in the vicinity of the base station apparatus due to an uplink/downlink propagation delay.

Moreover, the LTE adopts the SC-FDMA (Single Carrier-Frequency Division Multiple Access) scheme as an uplink modulation scheme and does not perform spectrum spreading as with the 3G, and therefore there is a necessity for adopting measures to prevent interference (temporal overlapping) between RACH and PUSCH, for example.

The present invention provides a terminal apparatus and a base station apparatus capable of avoiding interference between RACH and channels other than RACH (e.g., PUSCH) even if a base station apparatus having a relatively large coverage is installed.

Means for Solving the Problem

The terminal apparatus of the present invention includes: a configuration including a receiving section that receives information transmitted from a base station apparatus about a cell radius within which a base station apparatus broadcast, that is transmitted by the base station apparatus; a control section that sets a length of a non-transmission interval included in RACH (Random Access Channel) transmitted to the base station apparatus based on a configuration number included in the information BCH (Broadcast Channel) received by the receiving section; and a RACH transmitting section that transmits, to the base station apparatus, the RACH including the non-transmission interval having the length set by the control section.

The base station apparatus of the present invention performs mapping scheduling on data transmitted by each terminal apparatus using a channel other than RACH (Random Access Channel). The base station apparatus includes a mapping determining section that performs, when a cell radius is greater than a predetermined threshold, mapping scheduling so that any channel other than the RACH is not assigned to a TTI (Transmission Time Interval) next to a TTI to which the RACH can be assigned.

Advantageous Effects of Invention

According to the present invention, the terminal apparatus adjusts the length of GT according to the information about the cell radius or the base station apparatus performs scheduling beforehand so that no channels other than RACH (e.g., channel such as PUSCH) are assigned to a region which is likely to receive interference, and it is thereby possible to prevent interference between RACH and channels other than RACH even if a base station apparatus having a large coverage is installed.

BRIEF DESCRIPTION OF DRAWINGS

FIG. 6 is a diagram illustrating examples of configuration numbers proposed in R1-072330;

FIG. 8 is a diagram illustrating an example of a table stored in the control section of the terminal apparatus according to Embodiment 1 of the present invention;

FIG. 11 is a diagram illustrating an example of a table stored in the control section of the terminal apparatus according to Embodiment 1 of the present invention;

BEST MODE FOR CARRYING OUT THE INVENTION

Hereinafter, embodiments of the present invention will be explained in detail with reference to the accompanying drawings.

Embodiment 1

A case will be explained in Embodiment 1 of the present invention where a terminal apparatus adjusts a format of RACH and a length of GT transmitted from a base station apparatus, based on a configuration number broadcast through BCH (Broadcast Channel) and thereby prevents interference between RACH and PUSCH and so forth.

Figure 7:
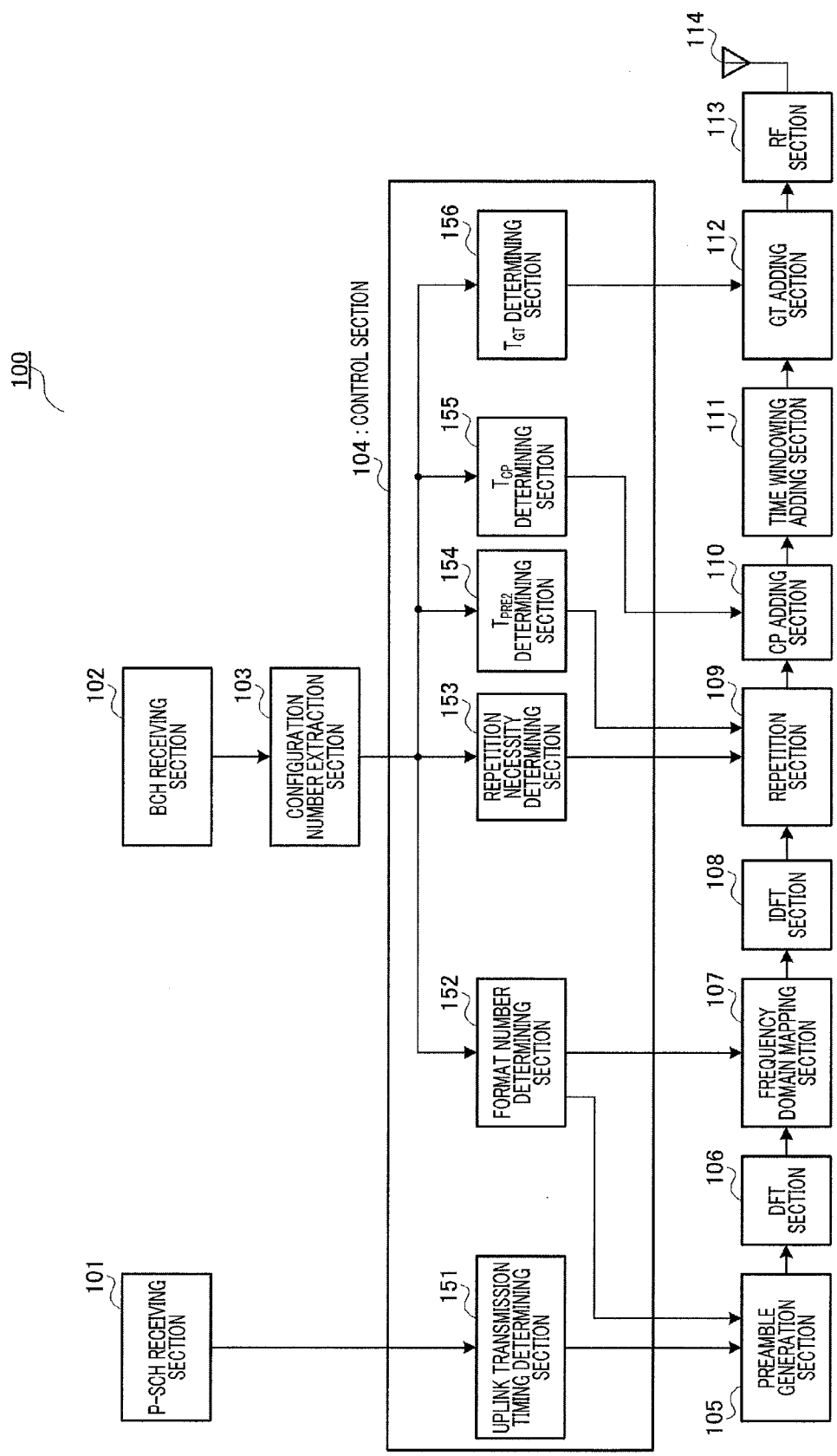
FIG. 7 is a block diagram illustrating main components of a terminal apparatus according to Embodiment 1 of the present invention.

FIG. 7 is a block diagram illustrating main components of the terminal apparatus according to the present embodiment. As shown in FIG. 7, to transmit RACH, terminal apparatus 100 according to the present embodiment includes P-SCH receiving section 101, BCH receiving section 102, configuration number extraction section 103, control section 104, preamble generation section 105, DFT section 106, frequency domain mapping section 107, IDFT section 108, repetition section 109, CP adding section 110, time windowing adding section 111, GT adding section 112, RF section 113 and antenna 114. Furthermore, control section 104 includes uplink transmission timing determining section 151, format number determining section 152, repetition necessity determining section 153, $T_{PRE2}$ determining section 154, $T_{CP}$ determining section 155 and $T_{GT}$ determining section 156.

P-SCH receiving section 101 receives P-SCH broadcast from the base station apparatus and outputs the P-SCH to control section 104. BCH receiving section 102 receives BCH periodically broadcast from the base station apparatus and outputs the BCH to configuration number extraction section 103.

Configuration number extraction section 103 extracts a 4-bit configuration number from the BCH received by BCH receiving section 102 and outputs the configuration number to control section 104.

Uplink transmission timing determining section 151 of control section 104 determines an uplink transmission timing of RACH based on a reception timing of the P-SCH reception and reports the uplink transmission timing to preamble generation section 105.

Furthermore, format number determining section 152 of control section 104 randomly determines preamble information (root index number of preamble, amount of cyclic shift, frequency domain mapping information), reports the root index number of preamble and the amount of cyclic shift to preamble generation section 105 and reports the frequency domain mapping information to frequency domain mapping section 107. Here, the frequency domain mapping information is information that indicates a frequency domain in which RACH is mapped.

Furthermore, control section 104 stores a table shown in FIG. 8 in an inner memory, determines the corresponding RACH format (whether or not to perform repetition, CP length $T_{CP}$, second preamble length $T_{PRE2}$, GT length $T_{GT}$) based on the configuration number extracted by configuration number extraction section 103 and reports the RACH format to each function block. To be more specific, repetition necessity determining section 153 determines whether or not to perform repetition and reports the determined repetition necessity result to repetition section 109. Furthermore, $T_{PRE2}$ determining section 154 determines second preamble length $T_{PRE2}$ and reports the determined result to repetition section 109. Furthermore, $T_{CP}$ determining section 155 determines CP length $T_{CP}$ and reports the determined result to CP adding section 110. Furthermore, $T_{GT}$ determining section 156 determines GT length $T_{GT}$ and reports the determined result to GT adding section 112. The method of setting the length of GT of the table shown in FIG. 8 will be explained below. The total length of RACH is set to a fixed value beforehand. When the cell radius of the base station apparatus exceeds 30 [km], that is, when the configuration number is equal to or greater than 12 in FIG. 8, if 0.2 [msec] is secured for the length of CP and the length of the second preamble is set to be equal to the length of the first preamble, the length of GT becomes less than the total value of the downlink propagation delay time and the uplink propagation delay time. Therefore, in FIG. 8 of the present embodiment, in order to make the length of GT is equal to or greater than the total value of the downlink propagation delay time and the uplink propagation delay time, 0.2 [msec] is secured for the length of CP and the length of the second preamble is set to be smaller than the length of the first preamble.

Preamble generation section 105 generates the preamble based on: the uplink transmission timing determined by uplink transmission timing determining section 151; and the root index number and the amount of cyclic shift reported from format number determining section 152, and outputs the preamble to DFT section 106. Here, preamble sequence $a_u(k)$ is expressed by equation 2 below.

$$a_u(k) = \exp\left(-j\pi u \frac{k(k+1)}{N_G}\right) \quad \text{(Equation 2)}$$

u in equation 2 above denotes a root index number. Furthermore, $N_G$ denotes a sequence length and is always constant regardless of the configuration number. There is an agreement of $N_G$=839 in the LTE.

DFT section 106 performs $N_G$ point discrete Fourier transform (DFT) on the preamble sequence, thereby convert the preamble sequence to a frequency domain and outputs the preamble sequence to frequency domain mapping section 107.

Frequency domain mapping section 107 maps the output signal of DFT section 106 to a predetermined region on the frequency axis according to the frequency domain mapping information reported from format number determining section 152 and outputs the output signal to IDFT section 108.

IDFT section 108 performs $N_{PRE}$ point discrete inverse Fourier transform (IDFT) on the output signal of frequency domain mapping section 107, thereby restores the output signal back to a time domain signal and outputs the output signal to repetition section 109. Here, $N_{PRE} \geq N_G$.

Repetition section 109 operates according to the determined repetition necessity result reported from repetition necessity determining section 153. That is upon receiving a report that repetition will not be performed, repetition section 109 performs no processing on the output signal of IDFT section 108 and outputs the output signal to CP adding section 110 as is. On the other hand, upon receiving a report that repetition will be performed, repetition section 109 performs repetition processing on the output signal of IDFT section 108 according to the second preamble length reported from $T_{PRE2}$ determining section 154 and outputs the output signal to CP adding section 110.

CP adding section 110 copies the last half portion of the preamble of the output signal of repetition section 109 based on the CP length reported from $T_{CP}$ determining section 155, creates a CP and adds this to the start of the preamble.

Time windowing adding section 111 performs, for example, raised cosine windowing processing on the output signal of CP adding section 110 and thereby performs processing of making the symbol end be terminated with 0.

GT adding section 112 adds a non-transmission interval to the output signal of time windowing adding section 111 based on the GT length reported from $T_{GT}$ determining section 156.

RF section 113 converts the frequency band of the output signal of GT adding section 112 to a high frequency band and then transmits the high frequency signal from antenna 114 to the base station apparatus.

Figure 9:
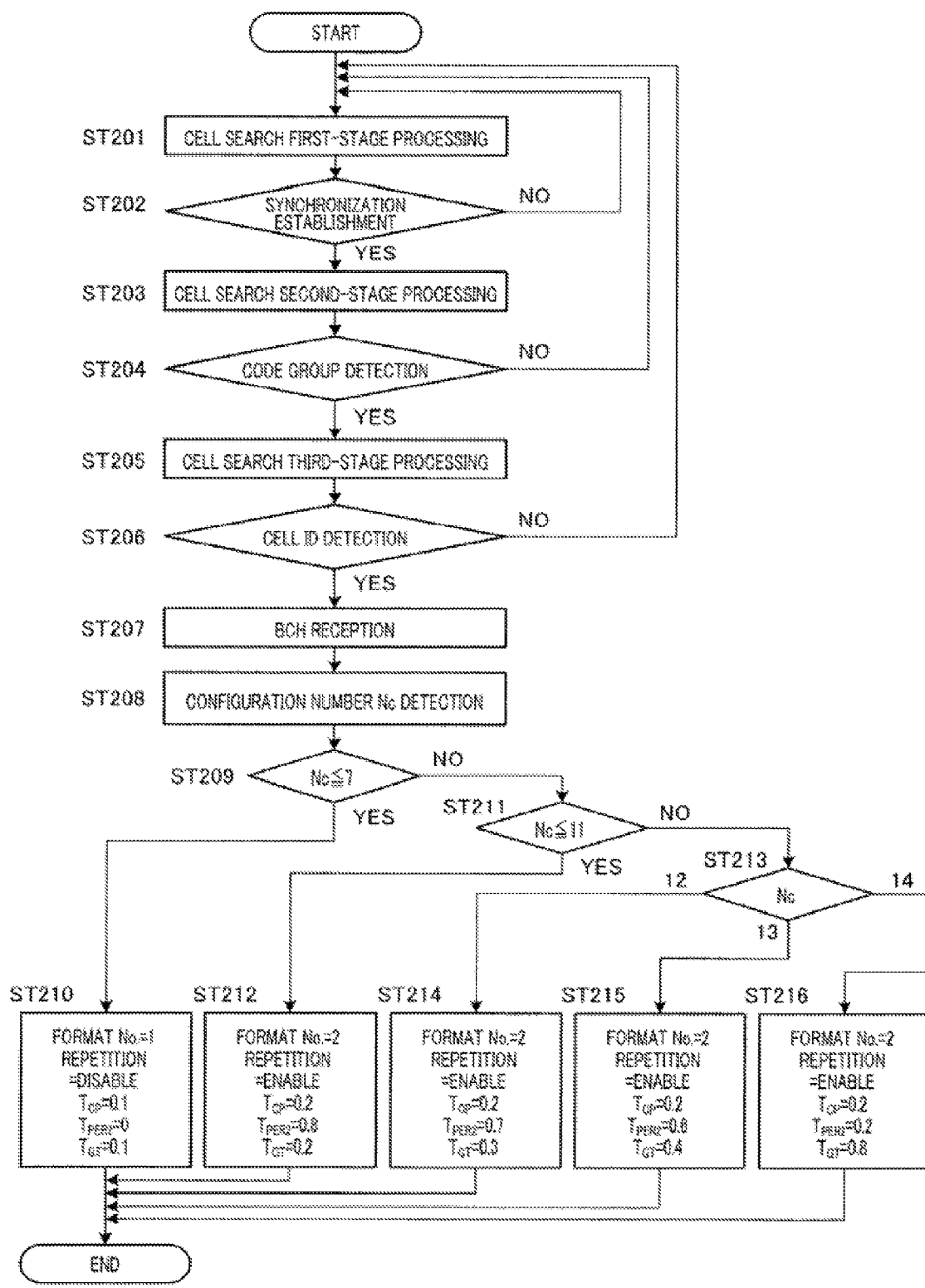
FIG. 9 is a flowchart illustrating a flow of RACH transmission processing by the terminal apparatus according to Embodiment 1 of the present invention.

Next, the flow of RACH transmission processing in the terminal apparatus according to the present embodiment will be explained using a flowchart in FIG. 9.

Immediately after power is turned ON for example, terminal apparatus 100 performs a cell search as initial-stage processing. To be more specific, terminal apparatus 100 performs the first step processing of the cell search using P-SCH broadcast from the base station apparatus and detects synchronization timing (ST201, ST202). When synchronization is established successfully (ST202; YES), terminal apparatus 100 then performs the second step processing of the cell search using S-SCH (Secondary Synchronization Channel) broadcast from the base station apparatus and detects a code group (ST203, ST204). When the code group is detected successfully (ST204; YES), terminal apparatus 100 finally performs the third-stage processing of the cell search and detects a cell ID (ST205, ST206). After completion of the above processing, the terminal apparatus 100 become able to receive a downlink signal.

Next, terminal apparatus 100 receives BCH periodically broadcast from the base station apparatus and detects a 4-bit configuration number Nc (ST207, ST208).

Figure 1:
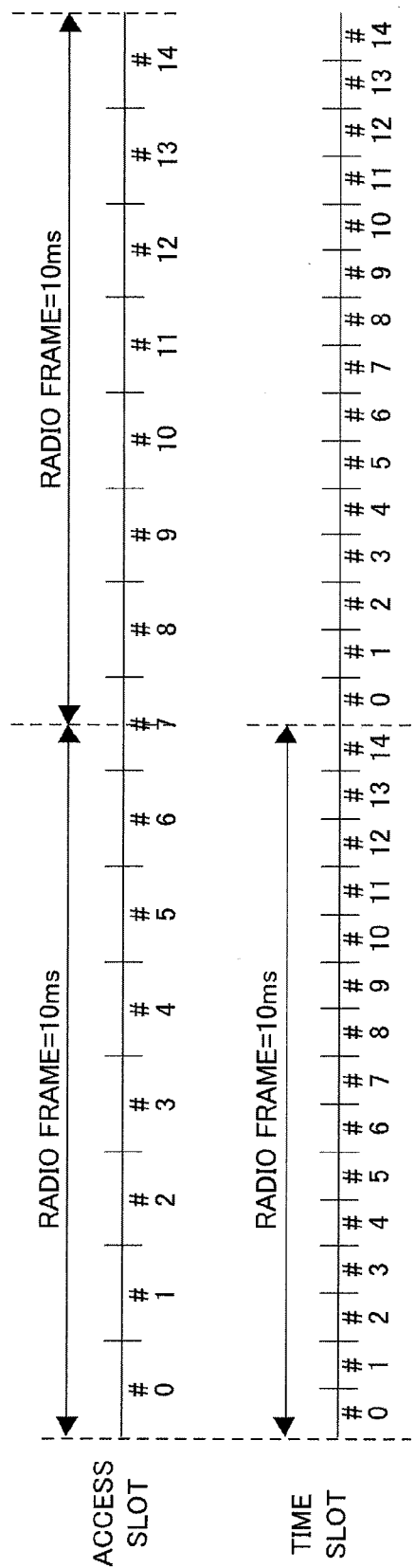
FIG. 1 is a diagram illustrating a slot for RACH and a slot for SCH in the 3G.
Figure 2:
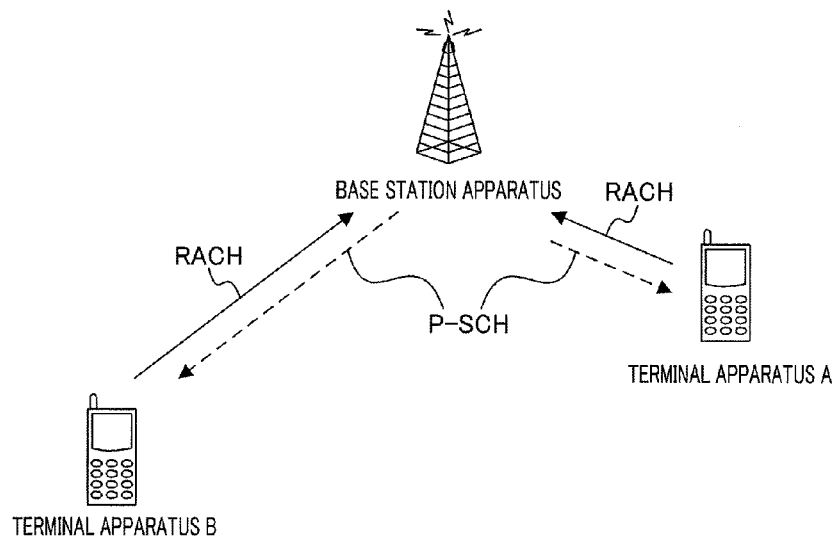
FIG. 2 is a system configuration diagram when two terminal apparatuses exist within a coverage of one base station apparatus.
Figure 3:
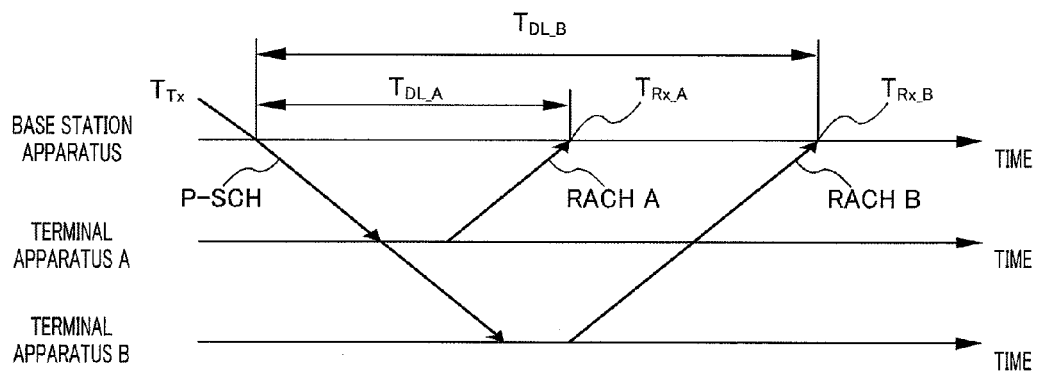
FIG. 3 is a diagram illustrating a lapse of time after a base station apparatus transmits P-SCH until receipt of RACH.
Figure 4:
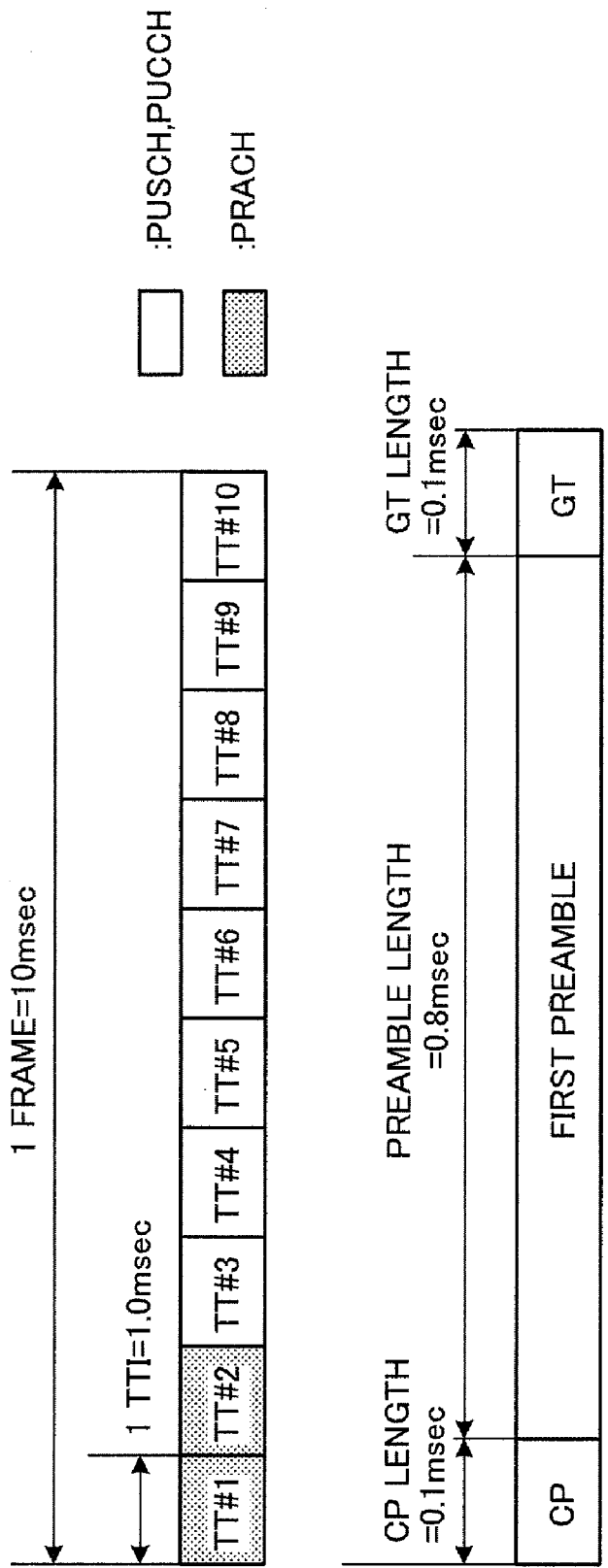
FIG. 4 is a diagram illustrating a first frame format of an uplink of the LTE.

Next, terminal apparatus 100 determines a RACH format (whether or not to perform repetition, CP length $T_{CP}$, second preamble length $T_{PRE2}$, GT length $T_{GT}$) from the table shown in FIG. 8 stored in the control section beforehand based on the configuration number. To be more specific, when the configuration number is equal to or less than 7 (ST209; YES), since the cell radius is equal to or less than 15 [km], terminal apparatus 100 does not perform repetition processing as the frame format shown In FIG. 4 (Format No.=1, repetition=Disable), sets the CP length to 0.1[msec] ($T_{CP}$=0.1), the second preamble length to 0 [msec] ($T_{PRE2}$=0) and the GT length to 0.1 [msec] ($T_{GT}$=0.1) (ST210). On the other hand, when the configuration number is equal to or more than 8 and equal to or less than 11 (ST209; NO, ST211; YES), since the cell radius is equal to or more than 15 [km] and equal to or less than 30 [km], terminal apparatus 100 performs repetition processing as the frame format shown in FIG. 5 (Format No.=2, repetition=Enable) to set the CP length to 0.2 [msec] ($T_{CP}$=0.2), second preamble length to 0.8 [msec] ($T_{PRE2}$=0.8) and GT length to 0.2 [msec] ($T_{GT}$=0.2) (ST212). On the other hand, when the configuration number is 12 (ST211; NO, ST213; $N_C$=12), terminal apparatus 100 performs repetition processing (Format No.=2, repetition=Enable) to set the CP length to 0.2 [msec] ($T_{CP}$=0.2), second preamble length to 0.7 [msec] ($T_{PRE2}$=0.7) and GT length to 0.3 [msec] ($T_{GT}$=0.3) (ST214). On the other hand, when the configuration number is 13 (ST211; NO, ST213; $N_C$=13), terminal apparatus 100 performs repetition processing (Format No.=2, repetition=Enable) to set the CP length to 0.2 [msec] ($T_{CP}$=0.2), second preamble length to 0.6 [msec] ($T_{PRE2}$=0.6) and GT length to 0.4 [msec] ($T_{GT}$=0.4) (ST215).

On the other hand, when the configuration number is 14 (ST211; NO, ST213; $N_C$=14), terminal apparatus 100 performs repetition processing (Format No.=2, repetition=Enable), sets the CP length to 0.2 [msec] ($T_{CP}$=0.2), second preamble length to 0.2 [msec] ($T_{PRE2}$=0.2) and GT length to 0.8 [msec] ($T_{GT}$=0.8) (ST216).

Figure 5:
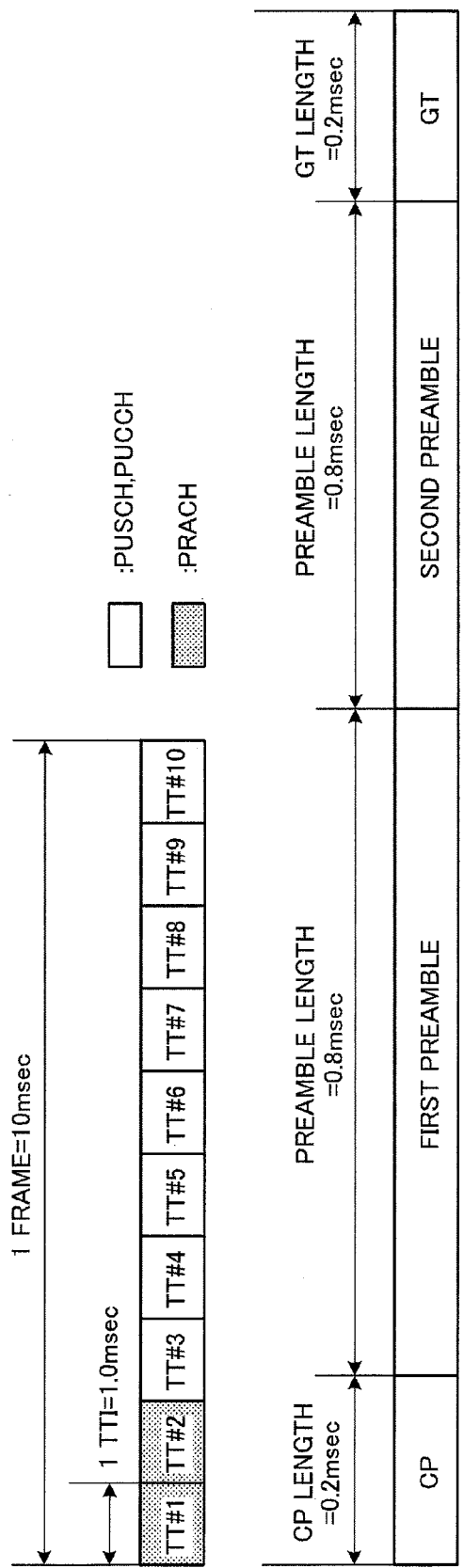
FIG. 5 is a diagram illustrating a second frame format of an uplink of the LTE.

In this way, when the configuration number is 12 to 14, since the cell radius is equal to or greater than 30 [km], GT needs to be further increased with respect to the frame format in FIG. 5. Since those configuration numbers have the cell radii 38.0, 57.4 and 115.8 [km], respectively, the respective uplink/downlink propagation delays are 0.253, 0.383 and 0.772 [msec] from equation 1 above, and therefore GT needs to be greater than these values to avoid interference. The present embodiment sets the GT lengths to 0.3, 0.4 and 0.8 [msec] respectively.

Figure 10:
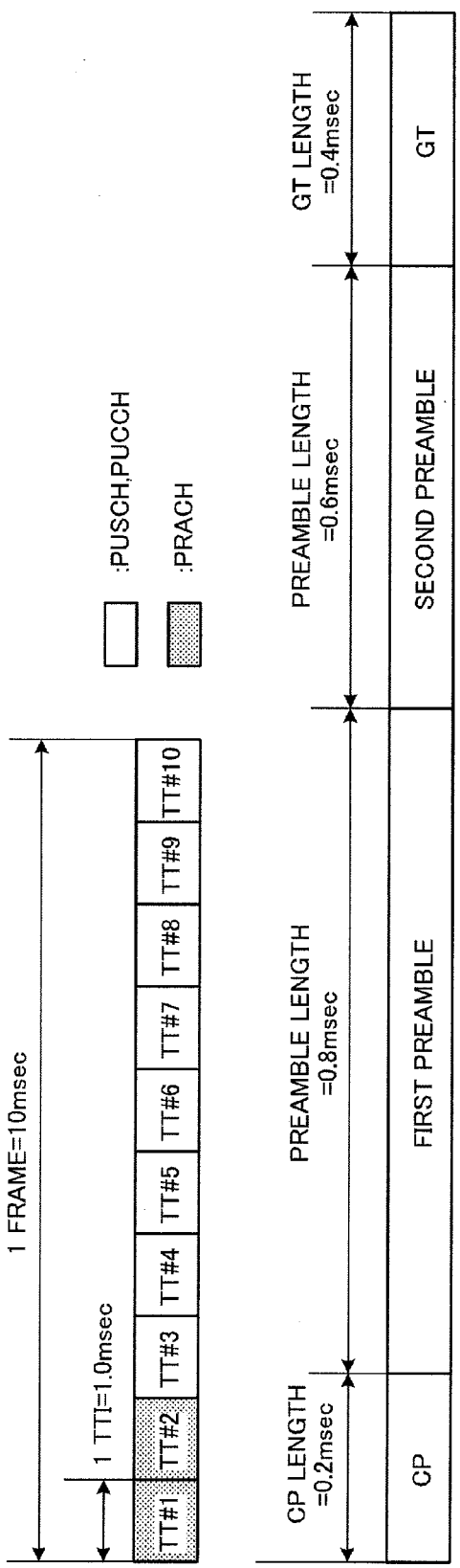
FIG. 10 is a diagram illustrating a frame format having configuration number is 13 according to Embodiment 1 of the present invention.

As an example of this, a frame format having a configuration number of 13 is shown in FIG. 10. Between FIG. 5 and FIG. 10, the frame format is the same but the RACH configuration is different. In FIG. 10, because of setting the GT length to 0.4 [msec], the repeated second preamble portion is reduced by 0.2 [msec] from the tail end thereof, so that the total length of RACH remains 2.0 [msec].

Figure 12:
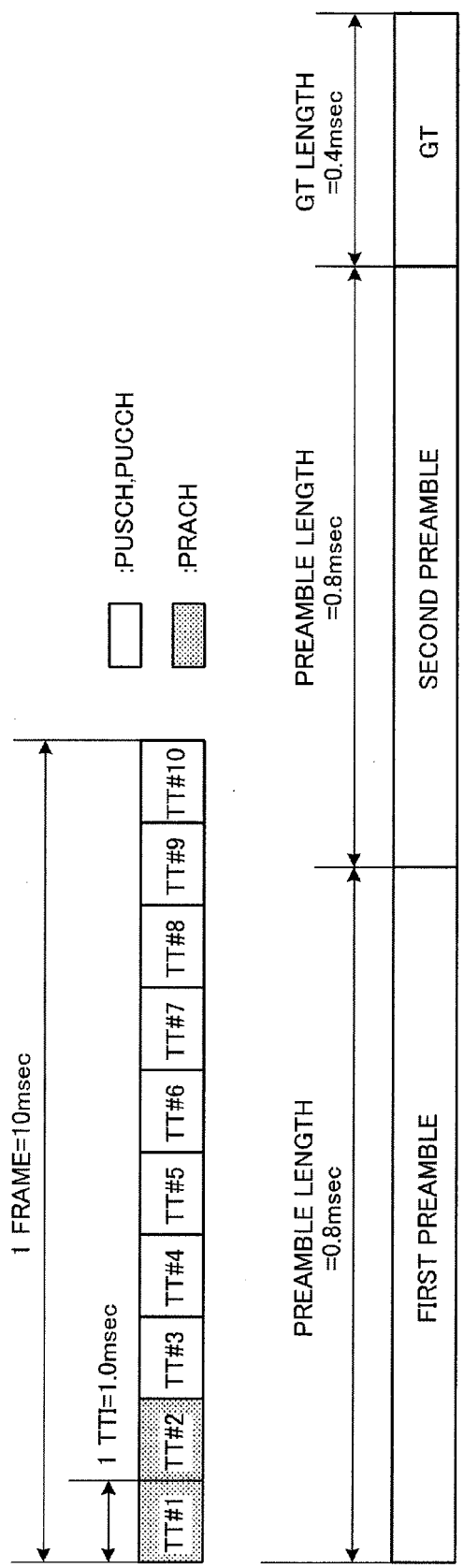
FIG. 12 is a diagram illustrating a frame format having configuration number is 13 according to Embodiment 1 of the present invention.

In the above example, it is described that the second preamble portion is shortened to increase GT while maintaining the total length of RACH, but CP may also be shortened instead of shortening the second preamble portion. The relationship between the configuration number and each parameter is shown in FIG. 11 in this case, and the frame format having a configuration number of 13 is shown in FIG. 12. Between FIG. 5 and FIG. 12, the frame format is the same but the RACH configuration is different. In FIG. 12, because of setting the length of GT to 0.4 [msec], CP is reduced by 0.2 [msec], so that the total length of RACH remains 2.0 [msec].

The frame format in FIG. 12 will be explained in detail below. When the cell radius of the base station apparatus exceeds 30 [km], that is, when the configuration number is equal to or greater than 12, if an attempt is made to secure 0.2 [msec] for the CP length and secure the length of the second preamble portion is the same as that of the first preamble portion, the GT length will be less than the total value of the downlink propagation delay time and the uplink propagation delay time. Therefore, in FIG. 12 of the present embodiment, the same length as the length of the first preamble is secured for the second preamble such that the GT length becomes equal to or greater than the total value of the downlink propagation delay time and the uplink propagation delay time, while CP is set to be shorter than 0.2 [msec] (FIG. 12 shows a case where the CP length is set to 0 [msec]).

Here, when CP is reduced preferentially, CP is preferably reduced from the head of CP. This is because the continuity between CP and the preamble can thereby be secured. When the amount of reduction is still not enough even after all CP is reduced, the length of the second preamble may be shortened. When the length of the second preamble is shortened, the length of the second preamble is preferably reduced from the tail end of the second preamble.

Figure 13:
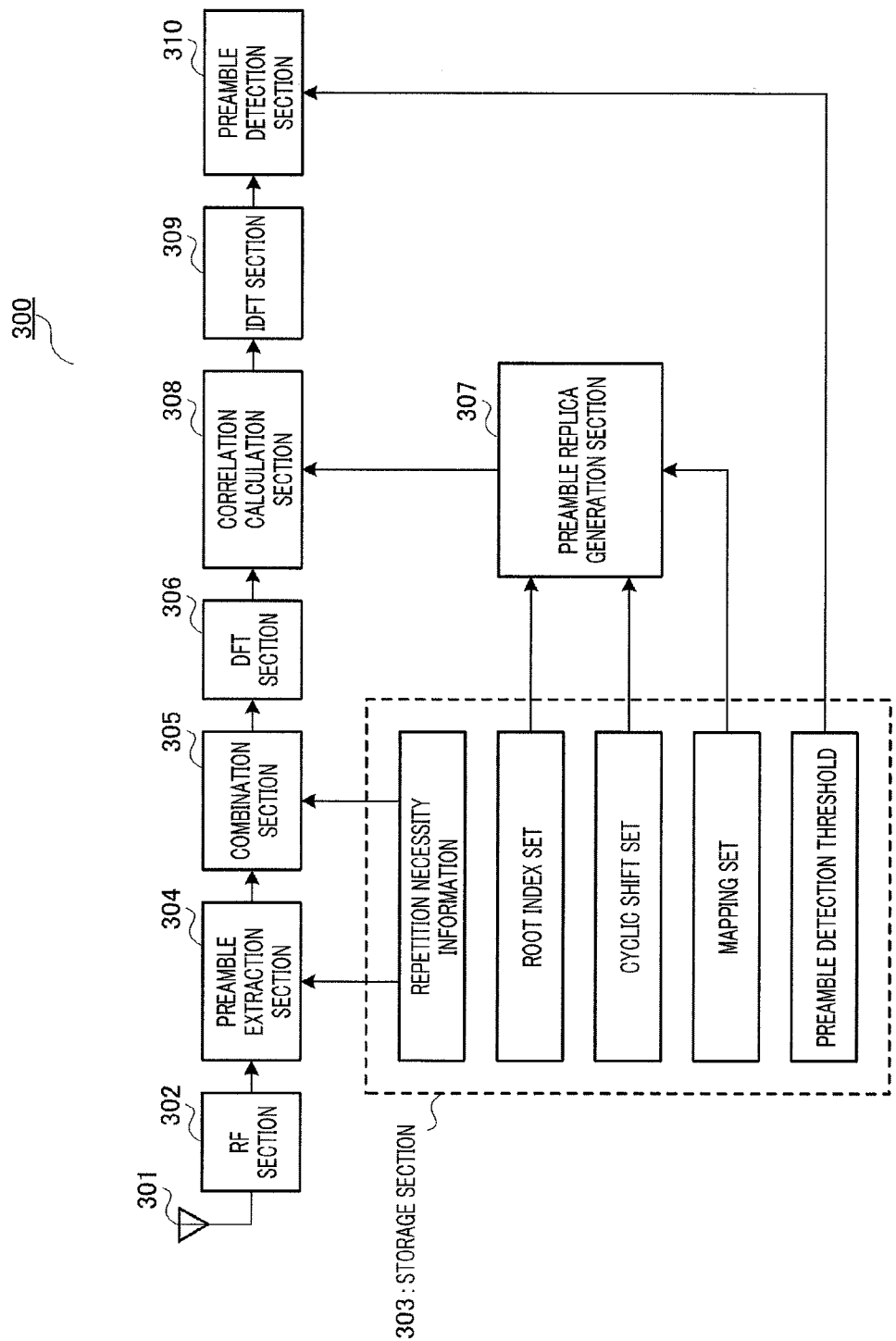
FIG. 13 is a block diagram illustrating main components of a base station apparatus according to Embodiment 1 of the present invention.

Next, preamble reception processing of RACH in the base station apparatus according to the present embodiment will be explained. FIG. 13 is a block diagram illustrating main components of the base station apparatus according to the present embodiment. As shown in FIG. 13, base station apparatus 300 according to the present embodiment includes antenna 301, RF section 302, storage section 303, preamble extraction section 304, combination section 305, DFT section 306, preamble replica generation section 307, correlation calculation section 308, IDFT section 309 and preamble detection section 310. Furthermore, storage section 303 stores repetition necessity information, root index set, cyclic shift set, mapping set and preamble detection threshold.

RF section 302 converts a high frequency signal received by antenna 301 to a baseband signal.

Preamble extraction section 304 determines a time window based on the repetition necessity information stored beforehand in storage section 303. That is, preamble extraction section 304 provides one time window when no repetition is performed and provides two time windows when repetition is performed. Preamble extraction section 304 then extracts a preamble portion from the output signal of RF section 302 in the time window.

Combination section 305 operates only when repetition is performed and coherently combines preambles extracted in the two time windows. This allows a combination gain up to 3 [dB] to be obtained.

DFT section 306 transforms the output signal of combination section 305 into a frequency domain by $N_{PRE}$ point DFT.

Preamble replica generation section 307 uses the root index set, the cyclic shift set and the mapping set preset in storage section 303 and generates all replicas that can be generated by all combinations of these sets.

Correlation calculation section 308 performs a frequency domain correlation calculation on the output signal of DFT section 306 with all preamble replicas generated by preamble replica generation section 307. IDFT section 309 converts the respective correlation results to time domain signals through $N_G$ point IDFT.

Preamble detection section 310 performs a preamble detection on the output signal of IDFT section 309. To be more specific, when there is a correlation value that exceeds a predetermined preamble detection threshold, preamble detection section 310 assumes that a preamble has been received.

Thus, according to the present embodiment, since the configuration number and the cell radius correspond one-to-one, the terminal apparatus adjusts the format of RACH and the length of GT according to the configuration number. By this means, even if a base station apparatus having a large coverage is installed, it is possible to avoid interference between RACH and channels other than RACH. To increase GT while maintaining the total length of RACH, the second preamble portion may be shortened or CP may be shortened.

A case has been illustrated in the present embodiment where RACH is made up of a first preamble and a second preamble, but the present invention is not limited to this and is also applicable to a configuration where a TTI length for RACH is extended and a third preamble is disposed. In this case, by deleting the tail end of the third preamble or CP, it is possible to adjust the total length of RACH to within the prescribed TTI length without producing discontinuous points between preambles.

Embodiment 2

Embodiment 2 of the present invention will describe a case where a base station apparatus performs scheduling beforehand so that channels such as PUSCH are not assigned to a region (=Restricted Block; RB) which is likely to receive interference thereby prevent interference between RACH and PUSCH or the like.

Figure 14:
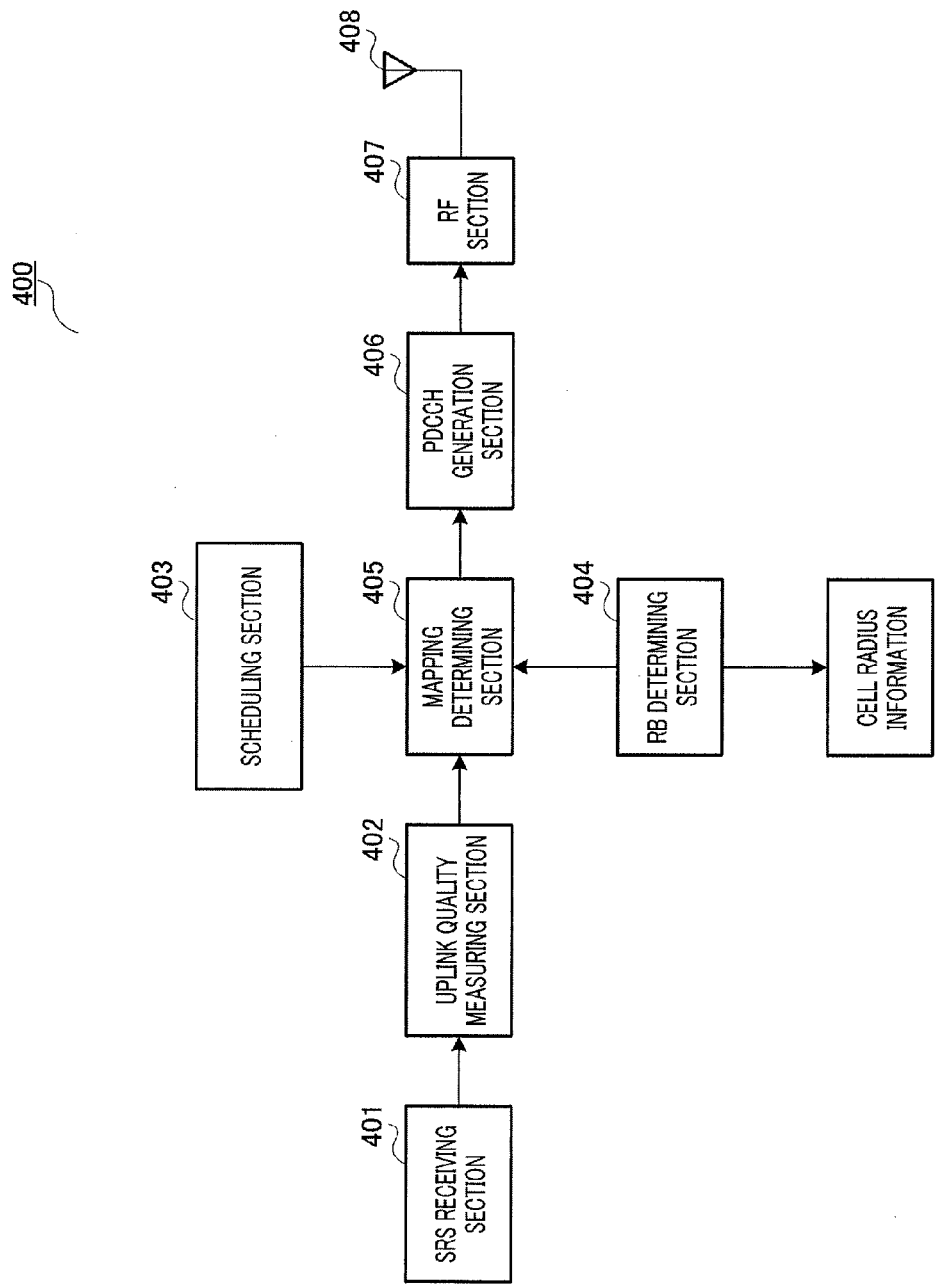
FIG. 14 is a block diagram illustrating main components of a base station apparatus according to Embodiment 2 of the present invention.

FIG. 14 is a block diagram showing main components of a base station apparatus according to the present embodiment. As shown in FIG. 14, base station apparatus 400 according to the present embodiment includes SRS receiving section 401, uplink quality measuring section 402, scheduling section 403, RB determining section 404, mapping determining section 405, PDCCH generation section 406, RF section 407 and antenna 408.

SRS receiving section 401 receives SRS (Sounding Reference Signal) regularly transmitted from each terminal apparatus and outputs the SRS to uplink quality measuring section 402. Uplink quality measuring section 402 measures uplink quality based on the SRS and outputs uplink quality information indicating the measurement result to mapping determining section 405.

Scheduling section 403 determines the required number of data blocks from QoS (Quality of Service) information and so forth of each terminal apparatus to be scheduled and reports the required number of data blocks to mapping determining section 405.

RB determining section 404 reads cell radius information defined beforehand for each base station apparatus from a memory, determines, when the cell radius information is equal to or less than 30 [km], that interference with RACH does not occur and reports "RB assign enable" to mapping determining section 405. On the other hand, RB determining section 404 determines, when the cell radius information is equal to or greater than 30 [km], that interference with RACH occurs and reports "RB assign disable" to mapping determining section 405.

Mapping determining section 405 determines assignment of a time and a frequency for each terminal apparatus to transmit PUSCH based on the uplink quality information, required number of data blocks and determination result of RB determining section 404. And the mapping determining section 405 outputs uplink mapping information indicating the determination result to PDCCH generation section 406.

PDCCH generation section 406 modulates the uplink mapping information, generates PDCCH (Physical Downlink Control Channel) and outputs PDCCH to RF section 407.

RF section 407 converts PDCCH to a high frequency band and them transmits the converted PDCCH from antenna 408 to each terminal apparatus.

Figure 15:
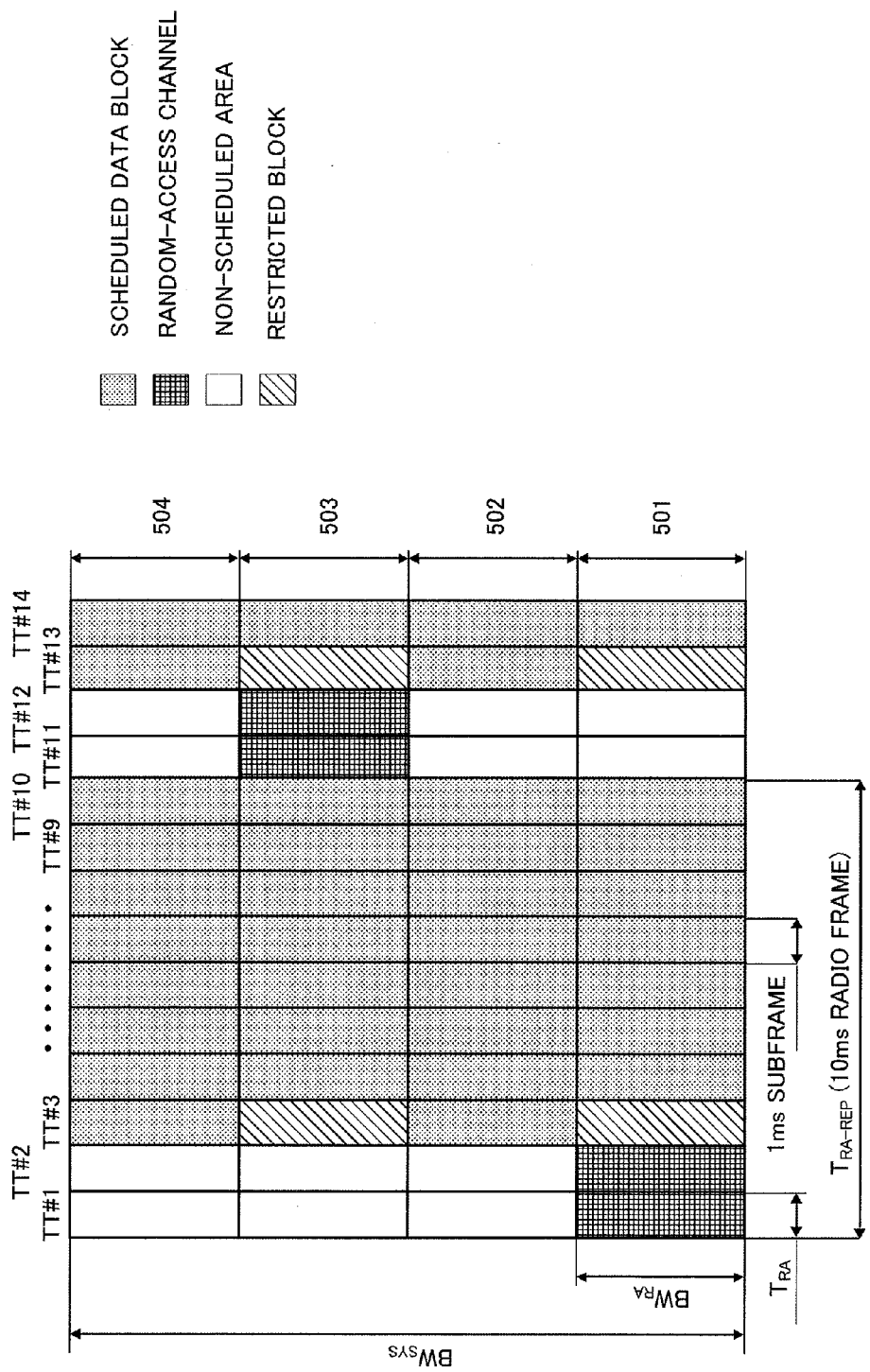
FIG. 15 is a diagram illustrating an example of mapping by a mapping determining section of the base station apparatus according to Embodiment 2 of the present invention.

FIG. 15 is a diagram illustrating an example of mapping in mapping determining section 405. In FIG. 15, it is supposed that an occupied bandwidth is divided into four parts (bands 501 to 504), band 501 and band 503 are allowed to be assigned as bands for RACH, and band 502 and band 504 are not allowed to be assigned as bands for RACH. FIG. 15 illustrates a case where a band for RACH is uniquely determined by the system, but the present invention is not limited to this and assignment may be dynamically changed according to a predetermined rule.

In the case of FIG. 15, RACH is assigned to one of band 501 band 503 and nothing is assigned to other bands in TTI#1 and TTI#2. Furthermore, channels other than RACH such as PUSCH and PUCCH are assigned to respective bands in TTI#3 to TTI#10. Here, when the determination result of RB determining section 404 is "RB assign Disable," mapping determining section 405 performs mapping so as not to assign PUSCH, PUCCH and so forth to RBs corresponding to TTI#3 of bands 501 and 503 which are bands to which RACH can be assigned, in order to avoid interference.

Figure 16:
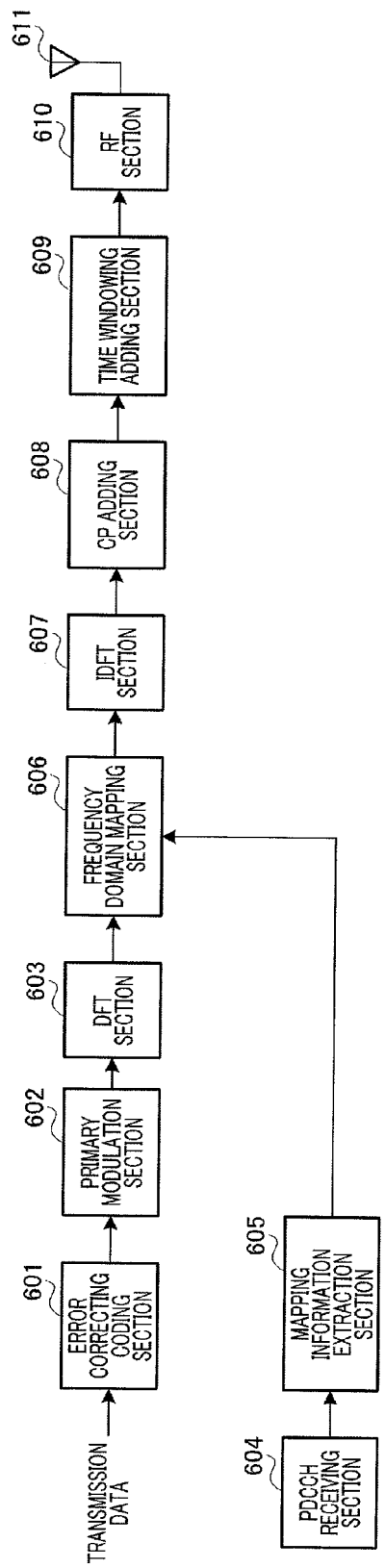
FIG. 16 is a block diagram illustrating main components of a terminal apparatus according to Embodiment 2 of the present invention.

Next, data transmission processing by the terminal apparatus according to the present embodiment will be explained. FIG. 16 is a block diagram illustrating main components of the terminal apparatus according to the present embodiment. As shown in FIG. 16, terminal apparatus 600 according to the present embodiment includes error correcting coding section 601, primary modulation section 602, DFT section 603, PDCCH receiving section 604, mapping information extraction section 605, frequency domain mapping section 606, IDFT section 607, CP adding section 608, time windowing adding section 609, RF section 610 and antenna 611.

Error correcting coding section 601 performs error correcting coding processing on transmission data and outputs the processed data to primary modulation section 602.

Primary modulation section 602 performs primary modulation processing, such as QPSK, on the output signal of error correcting coding section 601 and outputs the processed output signal to DFT section 603.

DFT section 603 performs discrete Fourier transform (DFT) on the output signal of primary modulation section 602, thereby, converts the output signal of primary modulation section 602 to a frequency domain signal and outputs the converted output signal to frequency domain mapping section 606.

PDCCH receiving section 604 receives PDCCH broadcast from the base station apparatus and outputs this PDCCH to mapping information extraction section 605.

Mapping information extraction section 605 extracts mapping information from the PDCCH reception result and outputs the mapping information to frequency domain mapping section 606.

Frequency domain mapping section 606 maps the output signal of DFT section 603 to a predetermined region on the frequency axis based on the mapping information and outputs the output signal to IDFT section 607.

IDFT section 607 performs discrete inverse Fourier transform (IDFT) on the output signal of frequency domain mapping section 606, thereby restores the output signal back to a time domain signal and outputs the time domain signal to CP adding section 608.

CP adding section 608 creates a CP for the output signal of IDFT section 607, adds the CP to the head of the output signal and outputs the output signal to time windowing adding section 609.

Time windowing adding section 609 performs raised cosine windowing processing or the like on the output signal of CP adding section 608 and thereby performs processing of making the symbol end be terminated with 0.

RF section 610 converts the frequency band of the output signal of time windowing adding section 609 to a high frequency band and then transmits the output signal from antenna 611 to the base station apparatus.

Thus, according to the present embodiment, since cell radius information is stored in the base station apparatus beforehand, the base station apparatus performs scheduling so as not to assign channels such as PUSCH to a region which is likely to receive interference. Even if a base station apparatus having a large coverage is installed, this makes it possible to prevent interference between RACH and PUSCH or the like.

The disclosure of Japanese Patent Application No. 2007-209915, filed on Aug. 10, 2007, including the specification, drawings and abstract is incorporated herein by reference in its entirety.

INDUSTRIAL APPLICABILITY

The present invention is suitable for use in a terminal apparatus and base station apparatus in a radio communication system where a base station apparatus having a large coverage may be installed.

The invention claimed is:

1. A terminal apparatus comprising:
a control section configured to set a length of a non-transmission interval included in a RACH (random access channel) transmitted to a base station apparatus based on information about a cell radius of the base station apparatus; and
a RACH transmitting section configured to transmit the RACH including the non-transmission interval having the length set by the control section to the base station apparatus,
wherein the RACH transmitted by the RACH transmitting section comprises a redundant interval, a first initial connection request signal interval arranged after the redundant interval, a second initial connection request signal interval arranged after the first initial connection request signal interval, and the non-transmission interval arranged immediately after the second initial connection request signal interval; and
wherein the length of the second initial connection request signal interval is shorter than the first initial connection request signal interval.

2. The terminal apparatus according to claim 1, wherein the control section is further configured to set the length of the non-transmission interval to be equal to or greater than a total value of a downlink propagation delay time and an uplink propagation delay time.

3. A terminal apparatus comprising:
a control section configured to set a length of a non-transmission interval included in a RACH (random access channel) transmitted to a base station apparatus based on information about a cell radius of the base station apparatus; and
a RACH transmitting section configured to transmit the RACH including the non-transmission interval having the length set by the control section to the base station apparatus,
wherein the RACH transmitted by the RACH transmitting section comprises a first initial connection request signal interval, a second initial connection request signal interval arranged after the first initial connection request signal interval, and the non-transmission interval arranged immediately after the second initial connection request signal interval; and
wherein the RACH has no signal interval before the first initial connection request signal interval.

4. The terminal apparatus according to claim 3, wherein the control section is further configured to set the length of the non-transmission interval to be equal to or greater than a total value of a downlink propagation delay time and an uplink propagation delay time.

5. A terminal apparatus comprising:
a control section configured to set a length of a non-transmission interval included in a RACH (random access channel) transmitted to a base station apparatus based on information about a cell radius of the base station apparatus; and
a RACH transmitting section configured to transmit the RACH including the non-transmission interval having the length set by the control section to the base station apparatus,
wherein the RACH transmitted by the RACH transmitting section comprises a redundant interval, a first initial connection request signal interval arranged after the redundant interval, a second initial connection request signal interval arranged after the first initial connection request signal interval, and the non-transmission interval arranged immediately after the second initial connection request signal interval; and wherein the control section is further configured to set a length of the redundant interval according to the length of the non-transmission interval while keeping a length of the RACH constant.

6. The terminal apparatus according to claim 5, wherein the control section is further configured to set the length of the non-transmission interval to be equal to or greater than a total value of a downlink propagation delay time and an uplink propagation delay time.

* * * * *